Dec. 10, 1935. M. R. TREMBOUR 2,023,908

METHOD OF MAKING COMPOSITE FERROUS ARTICLES

Filed Feb. 9, 1932

WITNESSES
A. B. Wallace.
F. B. Flick

INVENTOR
Marc R. Trembour
by Brown & Critchlow
his attorneys.

Patented Dec. 10, 1935

2,023,908

UNITED STATES PATENT OFFICE 2,023,908

METHOD OF MAKING COMPOSITE FERROUS ARTICLES

Max R. Trembour, Beaver, Pa., assignor to Jessop Steel Company, Washington, Pa., a corporation of Pennsylvania Application February 9, 1932, Serial No. 591,816

4 Claims. (Cl. 29—188)

This invention relates to composite steel stock for use in making various types of articles having a wear-resisting edge or surface, especially edged tools, shaping dies and other articles comprising a body of relatively cheap ferrous material, provided with a working face or tip of tool, wear-resisting, or other suitable steel.

The use of such composite articles is desirable for various reasons, for instance because the cost of such special steels renders articles consisting of them unduly expensive, or because of fabricating difficulties, or for other reasons. Such tools, or stock for making them, have been made prior to my invention generally by cementing or brazing tips and the like of the special steels to a body of cheap steel, or by casting one of the steels onto a body of the other maintained at welding temperature to form a welded ingot which is then worked to form tool stock shapes.

Such procedures are, in general, complicated, difficult of control, and require skilled and careful manipulation. Especial disadvantages have attended the ingot forming procedure referred to which requires special heating facilities and molds, and in which fluxes are generally necessary. Also, it has been essential to keep both metals at such temperature that they unite in making the ingot, otherwise satisfactory union of the parts could not be obtained. Moreover, these prior procedures have not been adapted to the production of large blanks, or special forms of blank, or for large output.

It is among the objects of this invention to provide composite stock of the type referred to by an improved method which minimizes the prevailing difficulties, provides satisfactorily joined stock of any desired shape and relation of facing to body material, and is simple and easily practiced.

Figure 1:
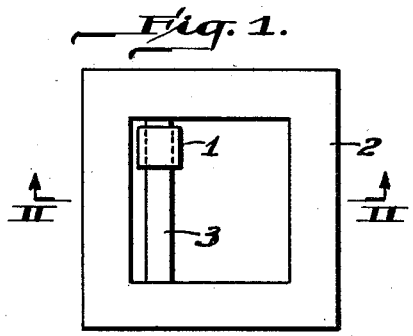
Figure 5:
Figure 6:
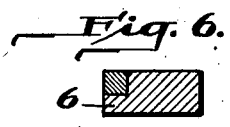
Figure 7:
Figure 2:
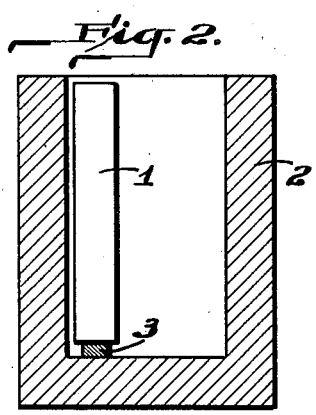
Figure 8:
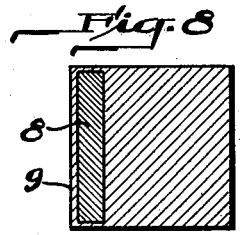
Figure 9:
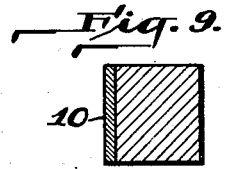
Figure 10:
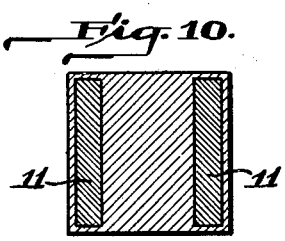
Figure 11:
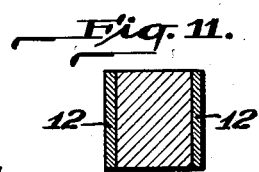
Figure 3:
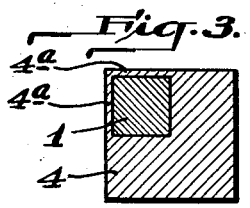
Figure 13:
Figure 4:
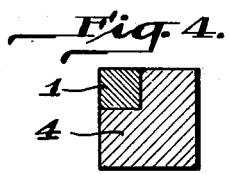
Figure 12:

The invention may be described in connection with the accompanying drawing, in which Fig. 1 is a plan view of a mold showing one mode of practicing the invention; Fig. 2 a vertical section through the mold, taken on line II—II, Fig. 1; Fig. 3 a cross section through a billet rolled from an ingot made in the mold shown in Figs. 1 and 2; Fig. 4 a cross section through a bar rolled from the billet shown in Fig. 3; Figs. 5 to 7 cross sections through tool and die blanks of various shapes formed from the bar shown in Fig. 4; Fig. 8 a cross section through another form of ingot, showing another embodiment of the invention; Fig. 9 a cross section through a billet formed from the ingot shown in Fig. 8; Figs. 10 and 11 views similar to Figs. 8 and 9, showing a further embodiment; Figs. 12 and 13 cross sectional views through composite sheets formed from the ingots shown in Figs. 8 and 10, respectively; and Fig. 14 a cross section through an ingot showing a further embodiment of the invention.

The invention is predicated upon my discovery that composite stock for making edged articles, shaping dies, and the like, may be formed readily and satisfactorily by casting soft steel or the like body metal completely around an insert composed of the desired facing or tool steel, and having surfaces which are in weldable condition, to form a composite ingot having the insert completely enveloped within the soft steel. Upon working such ingots in the customary manner, as by rolling, the surfaces of the insert become perfectly welded to the body of the ingot, thus forming a substantially integral composite structure from which the articles may be shaped.

The inserts used are formed from a steel suitable for the particular purpose for which the stock is intended, such as the various tool and die steels. The body of the ingot is preferably composed of common soft steel or other cheap steel having properties which adapt it for use as a body or backing of the article. As used hereinafter all such steels are, for brevity of reference designated respectively as tool steel and soft steel.

Attempts have been made heretofore to make composite articles of this type from ingots made by casting one of the metals, for example soft steel, around solid inserts of the other metal, e. g. tool steel. In making such composite ingots the two metals do not weld together, and as made heretofore welding has not been uniformly and satisfactorily obtained in rolling. I have discovered that this has been due to the fact that as previously prepared the ends of the insert were exposed, so that the surfaces became oxidized to a weld-resisting condition.

The use of inserts in a weldable condition and the complete surrounding of such inserts in a gas-tight metallic envelope constitute major features of this invention which cooperate in effecting the desired result. In this, as in the procedure just referred to, welding does not occur to any great extent in casting the ingot, but because the insert is so enclosed its surfaces are kept in condition to be pressure welded when the ingot is rolled, thus affording complete and satisfactory union between the two metals. Thus the invention obviates the need for obtaining welding in the ingot as formed, with its requisite use of fluxes, special facilities, and other disadvantages, as well as the prior lack of success in effecting welding in ingots made with solid inserts.

The surfaces of the inserts may be placed in weldable condition by removing grease, scale, dirt and the like, to provide a clean metallic surface. This may be done by pickling, but most suitably the surfaces are sand blasted, as the slight roughening caused thereby appears to be particularly favorable to pressure welding when the ingot is rolled. Similarly, the soft steel should be carefully freed of deoxidation products, such as alumina, which tend to separate at the surface and interfere with proper welding.

The invention may be described more in detail in connection with the accompanying drawing. Having reference to Figs. 1 and 2, an insert 1 is arranged in an ordinary ingot mold 2, and is held in position by any suitable means, such as a support 3. The insert is formed of the tool steel which is to form the tip or face of the tool. Before being mounted in the mold, the surfaces of the insert are treated to put them in clean metallic weldable condition, for example in the manners just described.

In accordance with the invention the insert is supported in the mold with its surfaces out of contact with those of the mold, so that the insert will be totally enveloped when metal is cast into the mold to form the ingot. In general it is desirable to position the insert closely adjacent to a mold surface or corner. For most purposes satisfactory results are had by supporting the insert about ¼ inch from the surfaces of the mold. This affords suitable protection to the inner surfaces, and such thin layers are removed readily in later stages to expose the insert surfaces for forming tools. The inserts may be used in an unheated condition, or may be heated to a point below surface discoloration.

Body metal 4, such as low carbon steel, is cast into the mold to completely surround the insert and form a composite ingot, in which the insert is completely enveloped by the body metal, as may be understood from Figs. 1 and 2. The ingot is then rolled according to customary rolling practice, to form a billet. Preferably it is transferred immediately after solidification, to a soaking pit or heating furnace, and is rolled thereafter at normal working temperature.

As indicated hereinabove, welding between the body metal and the insert does not ordinarily occur to any substantial extent in casting the ingots. However, the pressure applied in rolling brings the surfaces of the two parts into contact, and this with the elevated rolling temperature, induces welding, the surfaces being kept in weldable condition by virtue of the gas-tight metallic envelope formed by the ingot.

Generally it is desirable after welding has been effected to remove the layer of soft steel from the outer surface of the insert, in order to prevent or minimize migration of carbon into that layer from the tool steel. Such migration would be undesirable, as it might adversely affect the properties of the working edge or face of the tool. This skin of metal may be, and preferably is, removed after blooming, as by grinding off the soft steel layer 4a, Fig. 3. This can be done readily because the layers 4a are reduced in thickness in proportion to reduction of the ingot, and also by scaling. The billet is then rolled further to complete shaping of the stock, for example to form a bar such as shown in Fig. 4.

The rolled product then forms stock for forming tools. Thus the bars may be cut into appropriate lengths and shaped to make forming dies, such as that shown at 5, Fig. 5, or tool blanks of various shapes, two of which are shown at 6 and 7, Figs. 6 and 7. In each of these the tool, die, or the like comprises a body 4 of soft steel with a working tip or die face 1 of tool or wear-resistant steel.

Another embodiment of the invention is shown in Figs. 8 and 9, in which an insert 8 extends across one side of the ingot with its ends adjacent the corners. As in the preceding embodiment, the insert is totally surrounded by soft steel 9. After rolling and removing excess soft steel from the face of the insert there are produced bars of the sectional form shown in Fig. 9, adapted for use in making articles having a wide facing 10 of tool steel.

Still another embodiment is shown in Figs. 10 and 11, in which inserts 11 are positioned at opposite sides of the ingot. This is productive of stock which is faced on opposite sides with tool steel faces 12.

The invention has been described with particular reference to the use of square ingots, primarily for producing bar stock. However, other forms of ingot and stock produced are equally comprehended in the invention. For instance, these billets or bars may also be rolled to provide sheets, strips and the like composed of soft steel and integrally welded to one or both surfaces of a high grade tool steel or the like. Such facings may cover one or both surfaces, or any portion thereof, according to need, by suitably shaping and positioning the insert in the mold, as will be understood from what has been said above. Two such forms of sheet are shown in Figs. 12 and 13, these being made respectively by rolling of the ingots shown in Figs. 8 and 10.

Figure 14:
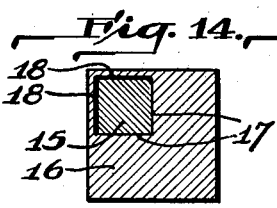

It will be observed that it is essential in the practice of this invention that the insert be completely enclosed in an envelope of the body metal in order to effect welding between the two when the composite ingot is rolled, and further that one or more faces of the insert are subsequently exposed in making a tool, die, or the like from the rolled ingot. The removal of such excess metal may be facilitated, if desired, by preventing welding between the envelope and the insert faces from which the envelope is later removed. This can be accomplished most conveniently by applying a weld-preventing coating to such face, the other faces being, of course, in a clean weldable condition, as described hereinabove. This embodiment is illustrated in Fig. 14, which shows an insert 15 enveloped as before in body metal 16. The inner faces 17 of the insert are in clean weldable condition, and the outer faces are covered with weld-preventing material 18, such as finely powdered silica. When the ingot is rolled faces 17 will weld to the contiguous body metal, but the coated outer faces will not weld to the envelope. Upon cutting a groove in the envelope adjacent the juncture of the welded and unwelded faces the excess envelope may be stripped off directly, thus exposing the outer faces for making a desired tool or other article.

Thus the invention provides composite stock for use in making tools, dies and other articles of like nature, all of which are comprehended herein by the word "tool" for brevity of reference. The invention overcomes many of the disadvantages of prior procedures, and provides satisfactorily welded composite stock. The method is simple and easily practiced, does not require special facilities, and does not interfere with or change normal rolling procedure. Other advantages will appear to those skilled in the art.

According to the provisions of the patent statutes, I have explained the principle and mode of practicing my invention and have illustrated and described what I now consider to represent its best embodiment. However, I desire to have it understood that, within the scope of the appended claims, the invention may be practiced otherwise than as specifically illustrated and described.

I claim:

1. The method of making a welded composite steel bar comprising a body of soft steel having a corner of harder steel extending throughout and welded to its entire length which comprises thoroughly cleaning a side of a pre-formed insert of said harder steel, casting said soft steel about said insert to completely envelop it and form a composite ingot the section of which is substantially greater than the section of the insert and in which the insert extends longitudinally substantially from end to end and is positioned eccentrically to the ingot section with one side or corner closely adjacent to a side or corner of the ingot with the cleaned side facing interiorly of the ingot, hot rolling said ingot while maintaining the continuity of the envelope of softer steel to effect pressure welding of the insert to said softer steel and to elongate the ingot into a bar, and exposing a longitudinal corner of the insert by removal of the overlying outer skin of softer steel.

2. The method of making a welded composite steel bar comprising a body of soft steel having a corner of harder steel extending throughout and welded to its entire length which comprises thoroughly cleaning at least two sides of a pre-formed insert of said harder steel, casting said soft steel about said insert to completely envelop it and form a composite ingot the section of which is substantially greater than the section of the insert and in which the insert extends substantially from end to end and is positioned closely adjacent to a corner with two of its sides parallel to the adjacent sides of the ingot and with its cleaned sides facing interiorly of the ingot, hot rolling said ingot while maintaining the continuity of the envelope of softer steel to effect pressure welding of the cleaned sides of the insert to said softer steel and to elongate the ingot into a bar, and exposing a longitudinal corner of the insert by removal of the overlying outer skin of softer steel.

3. The method of making a welded composite steel bar comprising a body of soft steel having a corner of harder steel extending throughout and welded to its entire length which comprises thoroughly cleaning a side of a pre-formed insert of said harder steel, casting said soft steel about said insert to form a composite substantially unwelded ingot the section of which is substantially greater than the section of the insert and in which the insert extends longitudinally substantially from end to end and is positioned eccentrically with one side or corner closely adjacent to a side or corner of the ingot with its cleaned side facing interiorly of the ingot, whereby the ingot section is unsymmetrical, the insert being completely enveloped on all sides and ends by the softer steel and having the faces adjacent the side or corner of the mold closely adjacent the surface of the ingot, hot rolling said ingot while maintaining the continuity of the envelope of softer steel to effect pressure welding of the insert to said softer steel and to elongate the ingot into a bar, and exposing a longitudinal corner of the insert by removal of the overlying outer skin of softer steel.

4. The method of making a welded composite steel bar comprising a body of soft steel having a corner of harder steel extending throughout and welded to its entire length which comprises thoroughly cleaning at least two sides of a pre-formed insert of said harder steel, casting said soft steel about said insert to completely envelop it and form a composite ingot the section of which is substantially greater than the section of the insert and in which the insert extends substantially from end to end and is positioned closely adjacent to a corner of the ingot with its cleaned sides facing interiorly of the ingot, whereby the ingot section is non-symmetrical, said insert, and soft steel being substantially unwelded in the cast ingot, hot rolling said ingot while maintaining the continuity of the envelope of softer steel to effect pressure welding of the insert to said softer steel and to elongate the ingot into a bar, and exposing a longitudinal corner of the insert by removal of the overlying outer skin of softer steel.

MAX R. TREMBOUR.